United States Patent [19]
Weisbarth et al.

[11] Patent Number: 5,511,847
[45] Date of Patent: Apr. 30, 1996

[54] FRONT END COVERING FOR A MOTOR VEHICLE

[75] Inventors: Hans Weisbarth, Stuttgart; Albert Hack, Sindelfingen; Rainer Tiefenbacher, Leinfelden-Echterdingen, all of Germany

[73] Assignee: Mercedes-Benz AG, Stuttgart, Germany

[21] Appl. No.: 319,001

[22] Filed: Oct. 6, 1994

[30] Foreign Application Priority Data

Oct. 6, 1993 [DE] Germany ............ 43 34 009.1

[51] Int. Cl.⁶ .................................................. B62D 35/00
[52] U.S. Cl. ........................................ 296/180.1; 296/208
[58] Field of Search ........................ 296/180.1, 180.5, 296/194, 208; 180/903; D12/169, 181

[56] References Cited

U.S. PATENT DOCUMENTS

| | | | |
|---|---|---|---|
| 3,884,516 | 5/1975 | Gallion et al. | 296/180.1 X |
| 4,569,551 | 2/1986 | Rauser et al. | 296/180.1 |
| 4,810,021 | 3/1989 | Burst | 296/180.1 |

FOREIGN PATENT DOCUMENTS

| | | | |
|---|---|---|---|
| 192934 | 9/1986 | European Pat. Off. | 296/180.1 |
| 3542376 | 6/1987 | Germany . | |
| 3617538 | 11/1987 | Germany . | |
| 3902886 | 8/1989 | Germany . | |
| 2189200 | 10/1987 | United Kingdom . | |

*Primary Examiner*—Dennis H. Pedder
*Attorney, Agent, or Firm*—Evenson McKeown Edwards & Lenahan

[57] ABSTRACT

A front end covering for a motor vehicle has air conducting paths which extend adjacent to the roadway on both sides from the vehicle front in the direction of the front wheels. The air conducting paths extend next to one another and are curved in the vertical direction of the vehicle, one air conducting path ending in front of the front wheel and the other air conducting path being constructed as a groove directed towards the interior side of the wheel which has a cross-section open towards the roadway. The other air conducting path is constructed on the bottom with an upwardly extending guiding surface which is curved in front of the front wheel in the longitudinal direction of the vehicle convexly with respect to the roadway. In this case, the air conducting path is curved in front of the front wheel concavely with respect to the roadway against the curvature of the guiding surface, and the distance between the air conducting path and the roadway is increasingly reduced, whereby a good aerodynamic flow around the wheel is achieved as well as a good cooling of the brakes.

8 Claims, 2 Drawing Sheets

FRONT END COVERING FOR A MOTOR VEHICLE

BACKGROUND AND SUMMARY OF THE INVENTION

This invention relates to a front end covering for a motor vehicle.

From German Patent Document DE-A 35 42 376, a front end covering is known which has a groove-shaped air conducting path for the cooling of the brakes and which, having a convex shape with respect to the roadway, extends from the vehicle front towards the interior side of the wheel. This groove is integrated into an underbody covering whose adjacent contour in front of the front wheel, also shaped in a convex manner, ends in front of the front wheel. As a result of this convexly shaped air conducting path in front of the front wheel which aims the air stream directly at the wheel, a high pressure is created in the wheel house which impairs the flow in the adjacent groove. As a result, the flow is decelerated whereby it can detach from the contour of the conducting surface in the groove, and therefore a smaller air flow reaches the brakes for cooling them. In this case, this disadvantage must be compensated by an air conducting part which covers a lot of space, causes costs and adjoins the groove. In addition, this air conducting part increases the lift at the front axle and the drag coefficient.

The following documents are mentioned with respect to the general background of the invention: German Patent Document DE-A 39 02 886 and German Patent Document DE-C 36 17 538.

An object of the invention is to improve the air stream flow in the groove of a front end covering of the initially mentioned type and thus improve the cooling of the brakes.

This object is achieved according to preferred embodiments of the invention by providing a front end covering for a passenger car, comprising airconducting paths which extend above the roadway on both sides from a vehicle front in a longitudinal direction of a vehicle, extend next to one another and are curved in the vertical direction of the vehicle, one of the air conducting paths respectively ending in front of the front wheel and the other being constructed, in each case, as a groove which is directed towards the interior side of the wheel and which is constructed with a cross-section which is open in the direction of the roadway and, on the bottom facing the vehicle underside has an upwardly extending conducting surface which is curved convexly with respect to the roadway, wherein the respective air conducting path which ends in front of the front wheel is curved in a concave manner towards the roadway against the curvature of the conducting surface which is directed towards the interior side of the wheel, and wherein the distance between the air conducting path and the roadway is increasingly reduced in the longitudinal direction of the vehicle.

As a result of this front end covering, the aerodynamic flow around the vehicle is improved and a good cooling of the brakes is also achieved. The air conducting path, which is curved concavely with respect to the roadway and ends in front of the front wheel, improves the flow around the front wheel, displaces the stagnation point in front of the wheel in the direction of the roadway and thereby prevents a high pressure in the wheel house in front of the front wheel, whereby the flow can follow the conducting surface in the groove to the brakes. A high pressure would have the result that the flow in the groove would be decelerated and would be detached from the conducting surface in the groove whereby a deterioration would be caused of the cooling of the brakes. In addition, the increasing curvature of the conducting surface of the groove decreases the influence of the distance between the roadway and the vehicle floor on the cooling of the brakes.

The groove can be adapted to the vehicle conditions in such a manner that, when the degree of steering lock differs, a sufficient amount of cooling air is always conducted to the brakes. The front end covering, as a separately mountable assembly part, also allows a shaping in the sense of a covering plate which protects the engine compartment from dirt.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
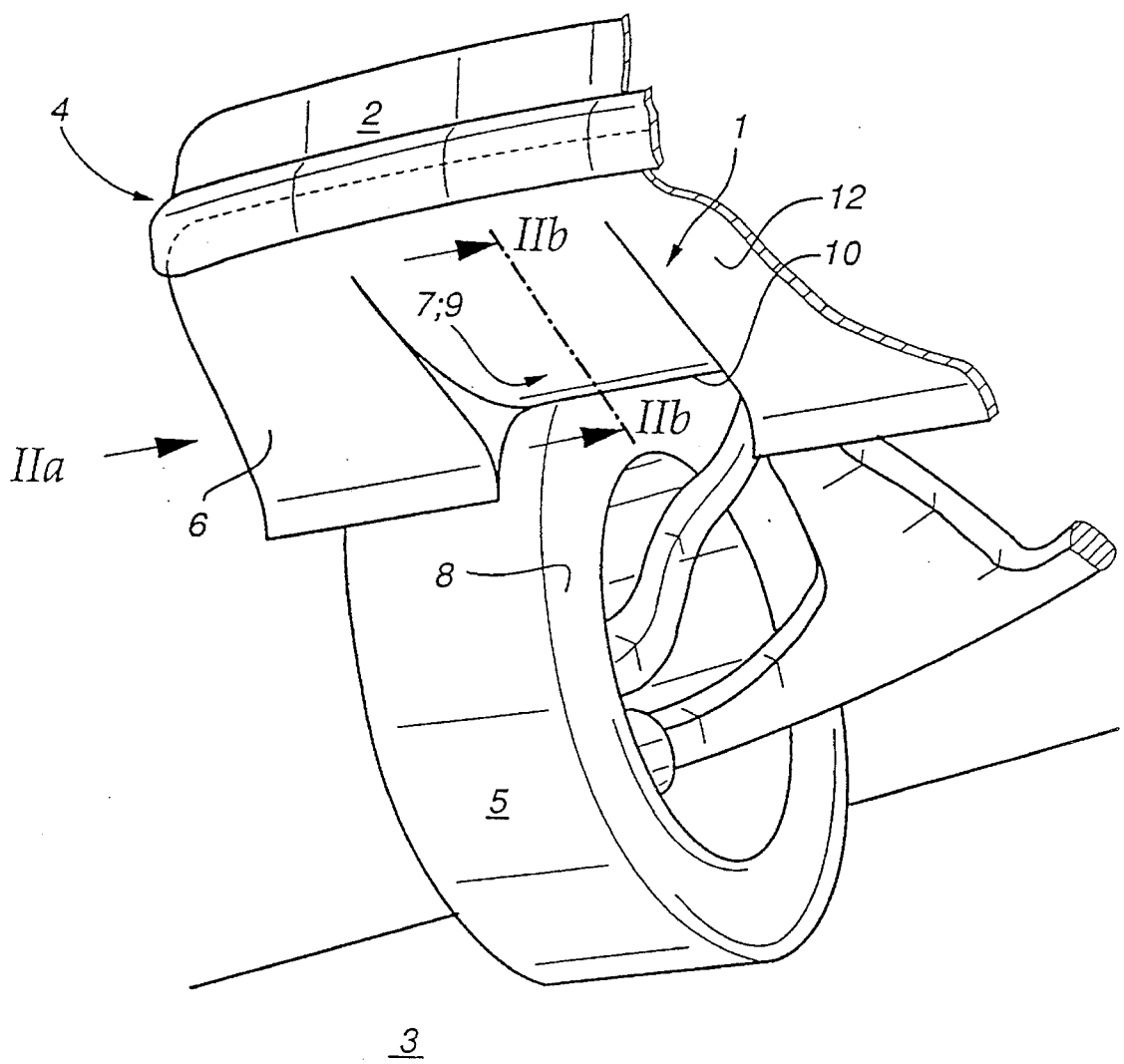
FIG. 1 is a view from the bottom front of the right side (in the driving direction) of a front end covering of a motor vehicle, constructed according to a preferred embodiment of the invention.

FIG. 1 illustrates a section of a front end covering 1 which is on the right in the driving direction and is situated on a motor vehicle, which is not shown in detail, comprising air conducting paths 6, 7 which are provided below a bumper 2 on two vehicle sides respectively, extend above a roadway 3 from the vehicle front 4 in the longitudinal direction of the vehicle, i.e., in the direction of the respective front wheel 5, extend next to one another and are curved in the vertical direction of the vehicle.

Figure 2A:
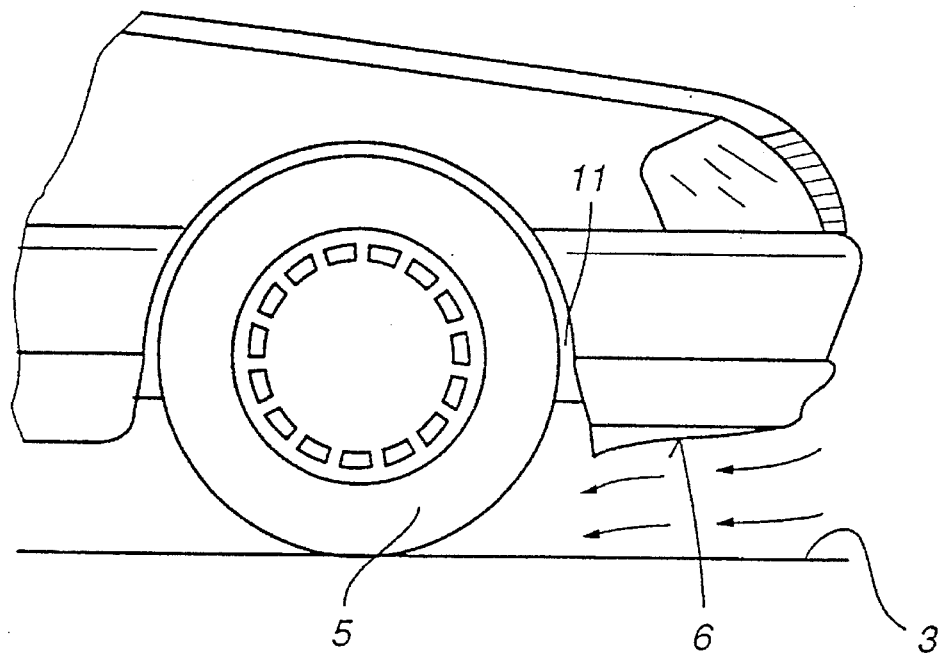
FIG. 2a is a lateral view in the direction of arrow IIa of FIG. 1, from the right of the front end covering or the air conducting path in front of the front wheel, of a vehicle with the front end covering of FIG. 1.
Figure 2B:
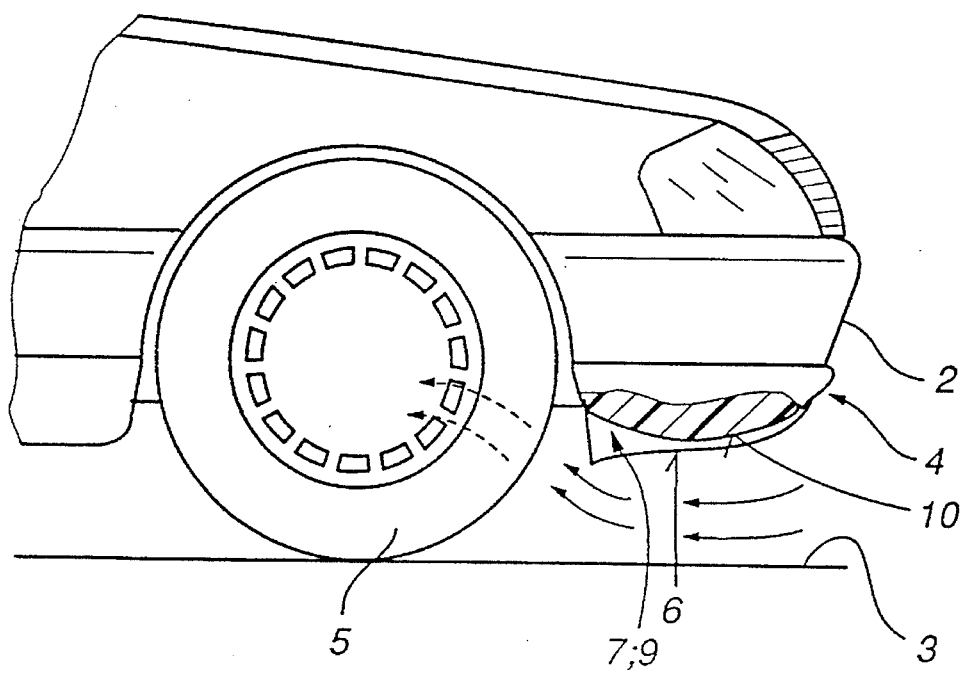
FIG. 2b is a sectional view of the groove corresponding to Line IIb—IIb in FIG. 1.

The air conducting path 7 shown in its course in FIG. 2b is constructed as a groove 9 directed towards the interior side 8 of the wheel. The groove 9 has a cross-section which is open in the direction of the roadway 3 and has an upwardly extending conducting surface 10 on the bottom facing the underside of the vehicle, which surface 10 is curved convexly with respect to the roadway 3. Through this groove 9, the air stream is guided towards the interior side 8 of the wheel and thus towards the vehicle brakes and, as a result, these brakes are cooled.

The course of the air conducting path 6 is illustrated in FIG. 2a. It ends in front of the front wheel 5 and has a curvature here which is concavely shaped with respect to the roadway 3 against the course of the conducting surface 10 which is directed to the interior side of the wheel. The air conducting path 6, which guides the air flow in front of the front wheel 5 increasingly in the direction of the roadway 3 shifts the stagnation point at the wheel 3 in the downward direction, results in a better flow around the front wheel 5 and thus to a lower drag coefficient and therefore minimizes, because of its special course, the pressure in the wheel house 11 at the outlet of the groove 9. As a result, it is ensured that the conducting of the air in the adjacent groove 9 can take place without any special resistance in the wheel house 11 which could result in the detachment of the air flow from the conducting surface 10, whereby a sufficient amount of cooling air always reaches the brakes.

Because of the distance of the conducting surface 10 from the roadway 3 which increases in the longitudinal direction of the vehicle, the influence of the distance of the roadway on the conducting of the air and this on the cooling of the brakes is minimized. The groove 9 is arranged in such a manner that a sweeping takes place over a larger area of the steering angle as the result of its conducting of the air, whereby a sufficient cooling of the brakes takes place also during cornering. A useful covering of the engine compartment in the downward direction against the penetration of dirt and water may be provided by a floor covering part 12 which can be mounted separately and has integrated air conducting paths 6 and 7.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A front end air guide covering for a passenger vehicle of the type having a front wheel disposed behind a vehicle front end at a vehicle side and exhibiting a laterally inwardly facing wheel side, said air guide covering comprising:

a first air guide path section aligned with and extending laterally over a front facing end of a vehicle wheel when in an in use straight ahead driving position of the vehicle wheel, and a second air guide path section aligned with the inwardly facing wheel side, which second air guide path section is adjacent to and laterally inwardly of the first air guide path section, wherein both of said first and second air guide path sections face a roadway over which the vehicle travels when in an in use position on a vehicle, wherein the first air guide path section is curved concavely in a vehicle rearward direction to form a rearwardly decreasing vertical gap between the roadway and the first air guide path to thereby displace an air stagnation point in front of the vehicle wheel to limit high pressure in a wheel house in front of the wheel, and wherein the second air guide path section is curved convexly and forms a rearwardly increasing vertical gap over the second air guide path section from an intermediate point thereof to a rear end thereof disposed forwardly of said vehicle wheel to thereby direct brake cooling air flow to wheel brakes at the inwardly facing wheel side.

2. A front end air guide covering according to claim 1, wherein said air guide covering includes said first and second guide path sections at each lateral side of the vehicle front end for guiding air flow with respect to front wheels at each said lateral side.

3. A front end air guide covering according to claim 1, wherein said second air guide path section is configured as a downwardly open groove extending between said first guide path section and a part of said covering disposed laterally inwardly of said second air guide path section.

4. A front end air guide covering according to claim 3, wherein said air guide covering includes said first and second guide path sections at each lateral side of the vehicle front end for guiding air flow with respect to front wheels at each said lateral side.

5. A front end air guide covering according to claim 1, wherein the air guide covering is integrated into a floor covering part which is mountable to a vehicle separately of other vehicle structures.

6. A front end air guide covering according to claim 2, wherein the air guide covering is integrated into a floor covering part which is mountable to a vehicle separately of other vehicle structures.

7. A front end air guide covering according to claim 3, wherein the air guide covering is integrated into a floor covering part which is mountable to a vehicle separately of other vehicle structures.

8. A front end air guide covering according to claim 4, wherein the air guide covering is integrated into a floor covering part which is mountable to a vehicle separately of other vehicle structures.

* * * * *